US008095297B2

(12) United States Patent
Glugla et al.

(10) Patent No.: US 8,095,297 B2
(45) Date of Patent: Jan. 10, 2012

(54) METHOD AND SYSTEM FOR PRE-IGNITION CONTROL

(75) Inventors: Chris Paul Glugla, Macomb, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/070,710

(22) Filed: Mar. 24, 2011

(65) Prior Publication Data
US 2011/0191007 A1 Aug. 4, 2011

(51) Int. Cl.
*F02D 41/26* (2006.01)

(52) U.S. Cl. ............. 701/111; 123/435; 123/406.39

(58) Field of Classification Search .......... 701/103–105, 701/110–111; 123/305, 435–436, 406.19, 123/406.21, 406.29, 406.34, 406.37, 406.39, 123/406.47
See application file for complete search history.

(56) References Cited

U.S. PATENT DOCUMENTS

| | | | |
|---|---|---|---|
| 5,386,367 A | | 1/1995 | Ziegler et al. |
| 5,905,193 A | * | 5/1999 | Hashizume et al. ......... 73/35.09 |
| 6,044,824 A | * | 4/2000 | Mamiya et al. ............... 123/492 |
| 6,105,552 A | * | 8/2000 | Arisawa et al. .......... 123/406.37 |
| 6,354,264 B1 | | 3/2002 | Iwakiri et al. |
| 6,561,163 B1 | | 5/2003 | Takahashi et al. |
| 6,705,277 B1 | | 3/2004 | McGee |
| 7,128,048 B2 | | 10/2006 | Yamoaka et al. |
| 7,178,503 B1 | | 2/2007 | Brehob |
| 7,255,080 B1 | * | 8/2007 | Leone ..................... 123/169 PB |
| 7,275,519 B2 | * | 10/2007 | Miyazaki et al. ............. 123/431 |
| 7,533,651 B2 | * | 5/2009 | Surnilla ........................ 123/304 |
| 7,578,281 B2 | * | 8/2009 | Russell et al. ................ 123/304 |
| 7,740,009 B2 | * | 6/2010 | Shelby et al. ................. 123/637 |
| 2006/0243243 A1 | | 11/2006 | Fukasawa |
| 2010/0094528 A1 | | 4/2010 | Auclair et al. |
| 2011/0139120 A1 | * | 6/2011 | Rollinger et al. ............. 123/436 |
| 2011/0144893 A1 | * | 6/2011 | Rollinger et al. ............. 701/111 |

FOREIGN PATENT DOCUMENTS

| JP | 3-57878 | * | 3/1991 |
|---|---|---|---|
| JP | 11-13520 | * | 1/1999 |

OTHER PUBLICATIONS

Glugla, C. et al, "Method and System for Pre-Ignition Control", U.S. Appl. No. 13/070,720, filed Mar. 24, 2011, 45 pages.

* cited by examiner

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for addressing cylinder-to-cylinder imbalances in the incidence of pre-ignition and/or knock. Engine cylinders are fueled based on each cylinder's pre-ignition count to balance the incidence of pre-ignition in each cylinder. The fueling is adjusted to maintain engine exhaust at stoichiometry.

20 Claims, 5 Drawing Sheets

METHOD AND SYSTEM FOR PRE-IGNITION CONTROL

FIELD

The present description relates generally to methods and systems for controlling a vehicle engine in response to pre-ignition detection.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

For example, in response to the occurrence of a cylinder pre-ignition event, the affected cylinder or cylinder bank may be enriched for a defined number of combustion events. However, under the same operating conditions, some cylinders of an engine may have a higher incidence of pre-ignition than others. The higher pre-ignition rate may cause the affected cylinders to degrade earlier, thereby affecting engine performance.

Thus in one example, the above issue may be at least partly addressed by a method of operating an engine. In one embodiment, the method comprises, fueling each cylinder of the engine based on a pre-ignition count of each cylinder to bring each cylinder to a common pre-ignition count while maintaining an exhaust air-to-fuel ratio of the engine at or near stoichiometry.

In one example, an engine control system may compare the pre-ignition counts of each engine cylinder. Then, based on the comparison, each cylinder may be fueled to bring the pre-ignition count of each cylinder closer to each other, for example, to a common pre-ignition count. As an example, an engine cylinder with a relatively higher pre-ignition count (such as a pre-ignition count higher than the common pre-ignition count) may be enriched while an engine cylinder with a relatively lower pre-ignition count (such as a pre-ignition count lower than the common pre-ignition count) may be enleaned. The degree (e.g., amount, duration, etc.) of enrichment and enleanment may be based on the number of cylinders having a pre-ignition count different from the common count (and in which direction), as well as the deviation of each cylinder's pre-ignition count from the common pre-ignition count. Further, the amounts may be adjusted so that the exhaust air to fuel ratio of the engine is maintained at or near stoichiometry.

In this way, the fueling of each cylinder can be adjusted to balance the occurrence of pre-ignition in each cylinder, thereby reducing a high occurrence of pre-ignition in any given cylinder. At the same time, while balancing the cylinder pre-ignition counts, an air-to-fuel ratio of the engine exhaust can be maintained at stoichiometry. In this way, engine degradation due to pre-ignition can be reduced while improving engine fuel economy and exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
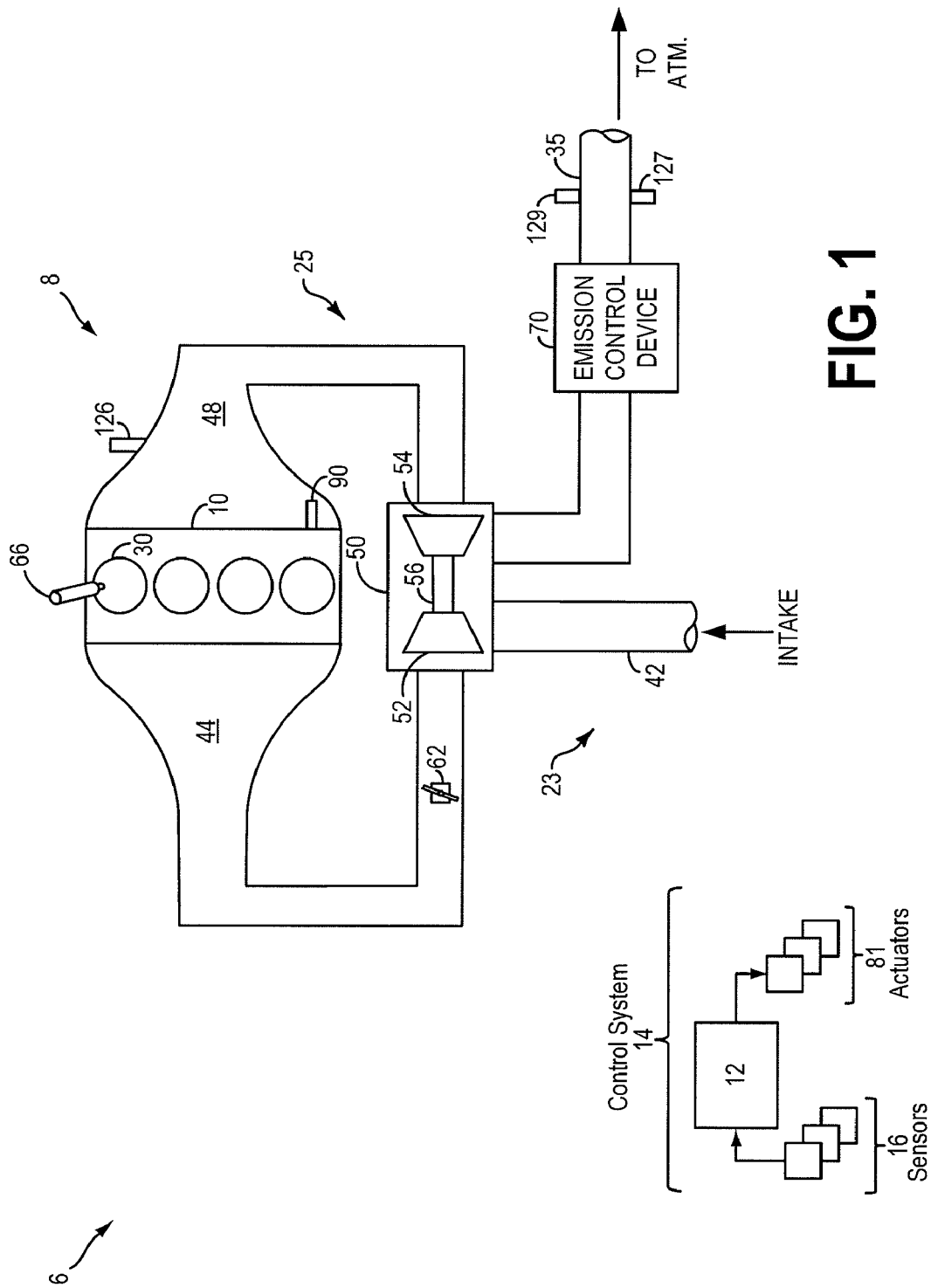
FIG. 1 shows an example engine system.
Figure 2:
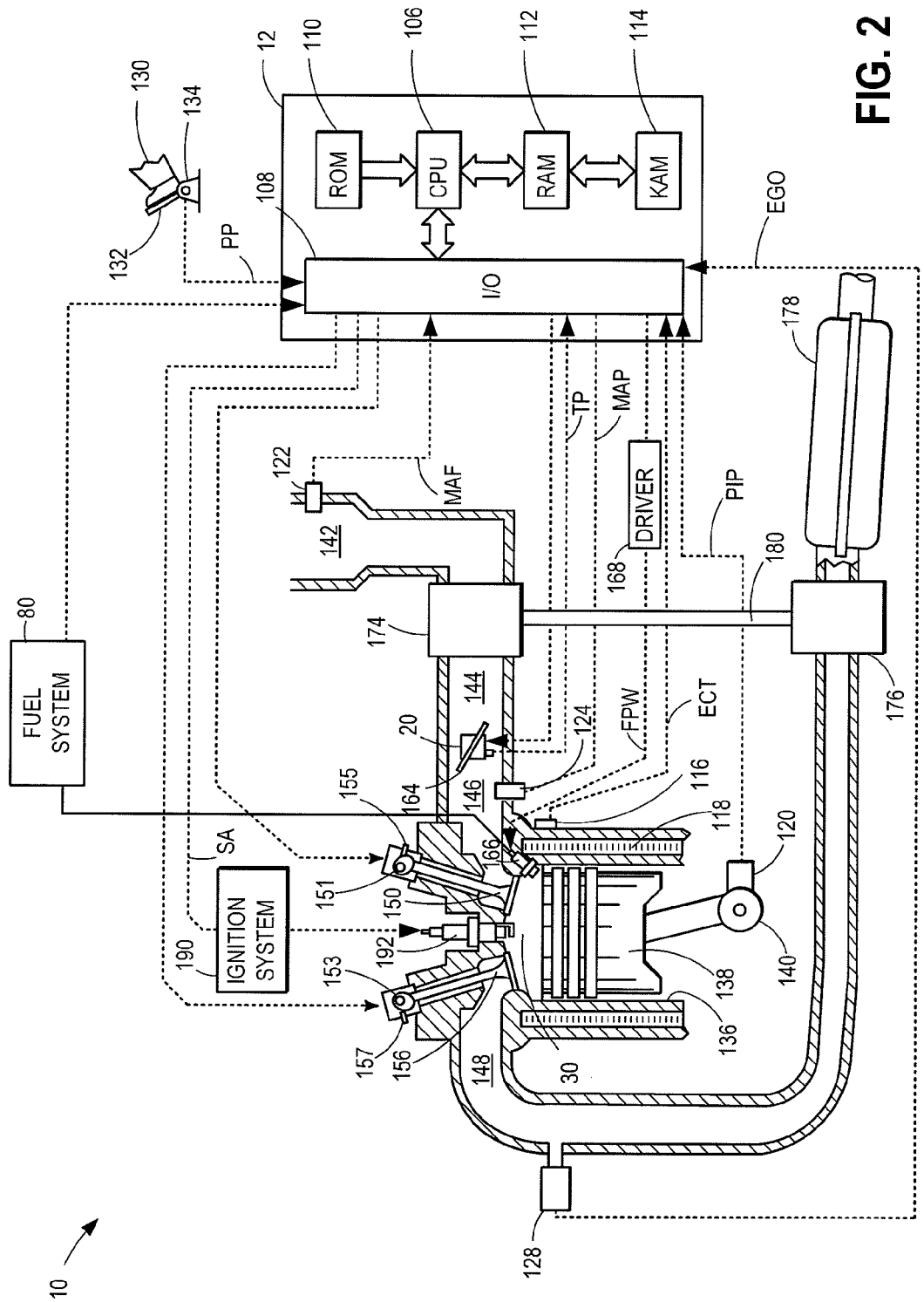
FIG. 2 shows an example combustion chamber.

The following description relates to systems and methods for balancing the occurrence of abnormal combustion events related to pre-ignition (and knock) in an engine, such as the engine system of FIGS. 1-2. An engine controller may compare the pre-ignition history, or counts, of each cylinder of the engine to one another. Based on the comparison, the controller may adjust the fueling of each cylinder to bring the pre-ignition count of each cylinder closer to one another, for example, to a common pre-ignition count. The controller may be configured to perform a control routine, such as the example routine of FIG. 3, to selectively enrich cylinders with a relatively higher occurrence of pre-ignition while selectively enleaning cylinders with a relatively lower occurrence of pre-ignition, based on the comparison. A degree of enrichment and a degree of enleanment may be adjusted such that the incidence of pre-ignition in the cylinders is balanced while maintaining an exhaust air-to-fuel ratio of the engine at or near stoichiometry. The controller may also compensate for cylinder torque transients (FIG. 4) by adjusting the spark timing of a given cylinder. An example fuel injection operation is illustrated herein with reference to FIG. 5. In this way, by adjusting cylinder fueling to balance cylinder pre-ignition counts, engine performance may be improved while addressing abnormal engine combustion events.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include one (as depicted) or more knock sensors 90 distributed along engine block 11.

When included, the plurality of knock sensors may be distributed symmetrically or asymmetrically along the engine block. Knock sensor 90 may be an accelerometer, or an ionization sensor.

An engine controller may be configured to detect and differentiate abnormal combustion events due to cylinder knocking from those indicative of cylinder pre-ignition based on the output (e.g., signal timing, amplitude, intensity, frequency, etc.) of the one or more knock sensors 90. In one example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows.

Mitigating actions taken by the engine controller to address knock may also differ from those taken by the controller to address pre-ignition. For example, knock may be addressed using ignition spark timing adjustments (e.g., spark retard) and EGR, while pre-ignition may be addressed using load-limiting and fuel enrichment.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensor(s) 90, temperature sensor 127, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with reference to FIG. 3.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
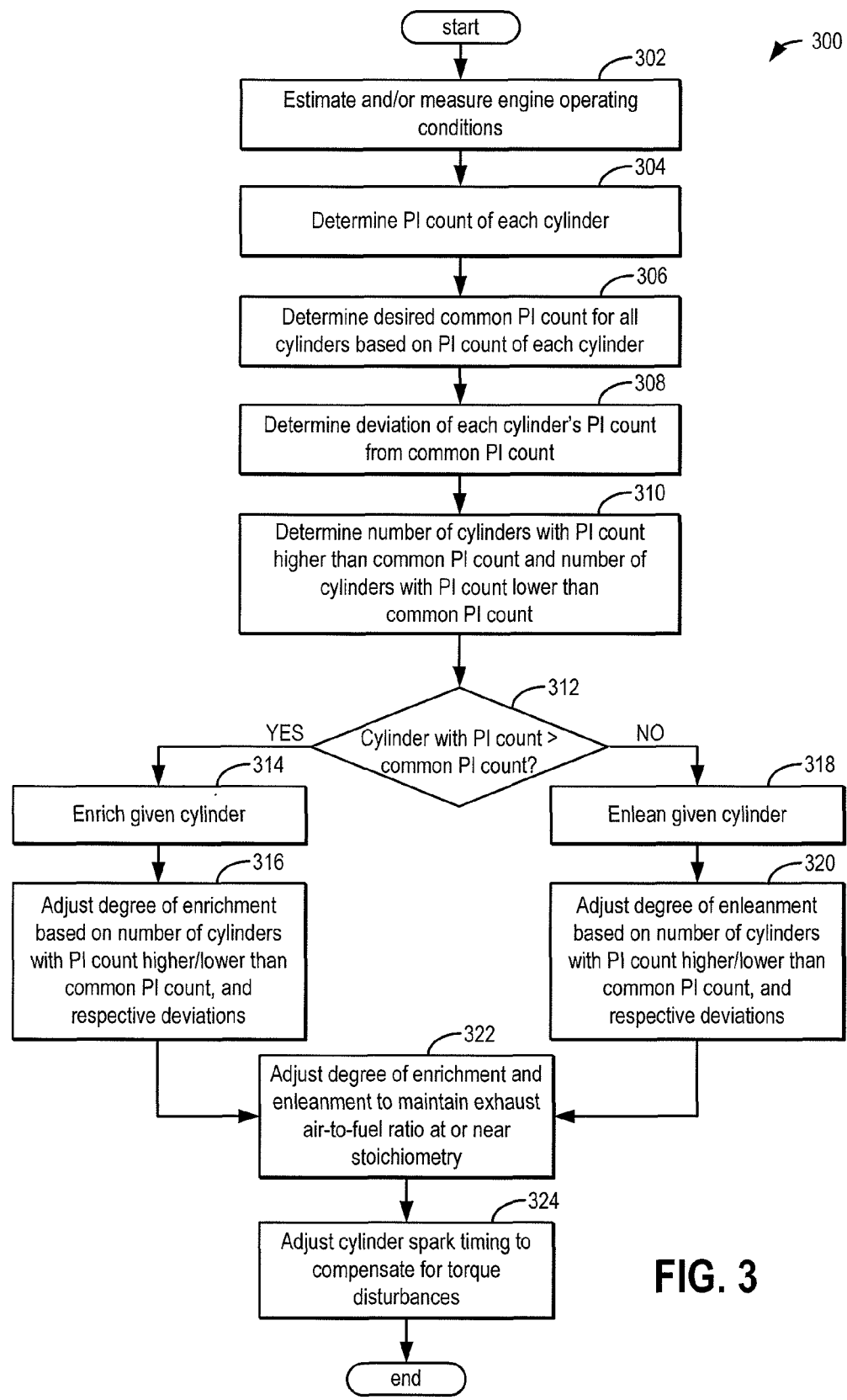
FIG. 3 shows a high level flow chart for balancing the occurrence of cylinder pre-ignition in an engine.

Now turning to FIG. 3, an example routine 300 is described for adjusting the fueling of each cylinder of an engine based on each cylinder's pre-ignition count to balance the occurrence of pre-ignition in all the cylinders while maintaining a stoichiometric exhaust air to fuel ratio. By balancing the pre-ignition count of all the cylinders, engine degradation due to frequent cylinder pre-ignition can be reduced.

At 302, engine operating conditions are estimated and/or measured. These include, for example, engine speed and load, boost, manifold pressure (MAP), manifold aircharge temperature (MCT), air-fuel ratio (lambda), fuel octane content, etc. At 304, the pre-ignition count of each cylinder may be determined. In one example, the pre-ignition count of each cylinder may be stored in a look-up table in the database of the engine controller. The look-up table may be updated at regular intervals (e.g., every engine cycle, every 50 miles, every hour, etc.), or in response to an occurrence of cylinder pre-ignition.

The pre-ignition (PI) count for each cylinder may include a cylinder trip PI count and a cylinder lifetime PI count, for example. The cylinder trip PI count may include an estimate of a total number of pre-ignition events in the cylinder over the present trip, or engine cycle. The cylinder lifetime PI count may include an estimate of the total number of pre-ignition events in the cylinder over the lifetime of engine operation. Further, individual cylinder lifetime PI counts and trip PI counts may be used to determine an overall engine lifetime and trip PI count. As such, each cylinder's PI count may represent the given cylinder's pre-ignition history, and may correlate with each cylinder's propensity for further pre-ignition events.

As such, under otherwise identical engine operating conditions, the incidence of pre-ignition in different cylinders may vary due to differences in manufacturing, as well as due to differences in compression ratio, effective heat rejection, fuel injection, etc. For at least some of the same reasons, the incidence of knocking may also vary between cylinders. Cylinders with a higher occurrence of pre-ignition and knocking may degrade earlier due to higher combustion pressures experienced therein. By balancing the incidence of abnormal combustion events in the different cylinders, that is, by bringing the pre-ignition count of all the cylinders to a common pre-ignition count, cylinder degradation due to pre-ignition may be reduced.

At 306, a desired common pre-ignition count for all the cylinders of the engine may be determined based on the pre-ignition count of each cylinder. In one example, the common pre-ignition count may be a weighted average of the pre-ignition count of all the cylinders of the engine. In another example, where the engine includes groups of cylinders, the common pre-ignition count may be a weighted average of the pre-ignition count of all the cylinders of the group. Alternatively, the common pre-ignition count may be an alternate statistical function (e.g., mean, mode, median, etc.) of the pre-ignition counts of all the cylinders.

At 308, a deviation of each cylinder's pre-ignition count from the common pre-ignition count may be determined. At 310, a number of cylinders with a pre-ignition count above the common pre-ignition count, and a number of cylinders with a pre-ignition count below the common pre-ignition count may be determined.

At 312, it may be confirmed whether a given cylinder has a pre-ignition count that is greater than the common pre-ignition count. If yes, then at 314, the routine includes enriching the cylinder with a relatively higher pre-ignition count. At 316, the degree of enrichment (e.g., amount, duration, etc.) of the given cylinder may be adjusted based on the number of cylinders with a pre-ignition count above the common pre-ignition count, the number of cylinders with a pre-ignition count below the common pre-ignition count, and further based on the deviation of each cylinder's pre-ignition count from the common pre-ignition count.

In comparison, if at 312 it is determined that the given cylinder has a pre-ignition count that is lower than the common pre-ignition count, then at 318, the routine includes enleaning the cylinder with the relatively lower pre-ignition count. At 320, the degree of enleanment (e.g., amount, duration, etc.) of the given cylinder may be adjusted based on the number of cylinders with a pre-ignition count above the common pre-ignition count, the number of cylinders with a pre-ignition count below the common pre-ignition count, as well as each cylinder's deviation from the common pre-ignition count.

At 322, the degree of enrichment and the degree of enleanment of the cylinders may be further adjusted to maintain an exhaust air-to-fuel ratio of the engine at or near stoichiometry. As such, typical pre-ignition mitigating fuel adjustments include cylinder enrichment or enleanment, with corresponding exhaust enrichment or enleanment. Herein, the inventors have realized that by selecting (e.g., prior to any cylinder fuel adjustment) a common pre-ignition count for all cylinders of an engine based on the number of cylinders as well as their respective pre-ignition counts, and then performing cylinder fuel adjustments to bring each cylinder to the preselected common pre-ignition count, rich fuel injections in some engine cylinders may be offset by lean fuel injections in other cylinders of the engine. For example, the degree of enrichment and enleanment not only obtains the desired common pre-ignition count in each cylinder, but also the mixture air-fuel ratio of those cylinders achieves a desired air-fuel ratio. Thus, cylinder fuel enrichment responsive to a high frequency of pre-ignition in one cylinder may be offset by a cylinder fuel enleanment that raises the frequency of pre-ignition in another cylinder (or cylinders). In this way, each cylinder is brought to a common incidence of pre-ignition to reduce the risk of degradation in cylinders with high pre-ignition occurrence. At the same time, a degree and number of cylinder enrichments is counterbalanced by a degree and number of cylinder enleanments to maintain the exhaust air to fuel ratio of the mixture of the cylinders at stoichiometry. Consequently, overall engine performance is improved.

Figure 4:
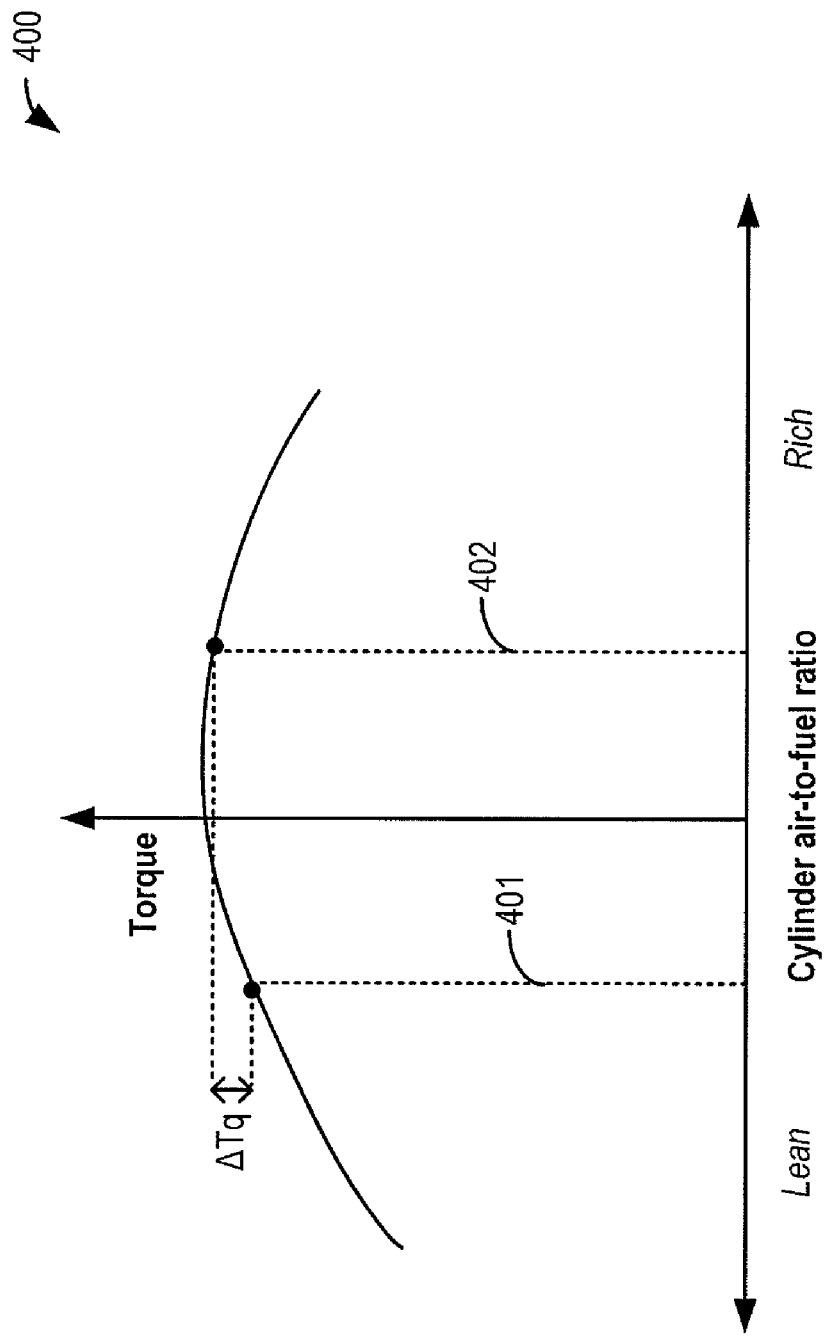
FIG. 4 shows example changes in cylinder torque in response to adjustments in cylinder fueling.

At 324, cylinder torque disturbances arising (or anticipated) from the cylinder fuel balancing adjustments may be compensated for by adjusting a cylinder spark timing. Specifically, the routine may include adjusting an ignition spark timing of at least one cylinder based on a cylinder torque difference between the cylinders. With reference to FIG. 4, it shows a map 400 of an example change in cylinder torque responsive to a change in a cylinder's air-to-fuel ratio (as may arise due to a change in the cylinder's fuel injection). In the depicted example, a relatively larger change (e.g., decrease) in torque may be seen for a first cylinder 401 that is enleaned by an amount, while a relatively smaller change (e.g., increase) in torque may be seen for a second cylinder 402 that is enriched by the same amount. As such, the engine controller may be configured to compute a torque difference between the cylinders (ΔTq) and compare the difference to a predetermined torque threshold. If the torque difference between the cylinders is larger than the threshold, the vehicle operator may feel the torque transient which may degrade the operator's drive experience. Thus, to compensate for this torque transient and to reduce the degraded drive feel experienced by the operator, the controller may adjust a spark timing of the second cylinder 402, for example, by increasing an amount of cylinder spark retard, to reduce the cylinder's torque, thereby reducing the torque difference between the cylinders. As such, this may (temporarily) reduce the engine torque by a small amount, however, this may be accepted to improve the driver's drive feel. An example cylinder spark timing adjustment is elaborated herein with reference to the example of FIG. 5.

While the depicted embodiment of routine 300 illustrates adjusting the fueling of each cylinder of the engine based on cylinder pre-ignition counts, it will be appreciated that in alternate embodiments, the fueling may be further adjusted based on a knock rate (that is, incidence of cylinder knock) of each cylinder to additionally bring the knock rate of each cylinder to a common (average) knock rate. Also, while the depicted embodiment illustrates cylinder fueling adjustments based on the pre-ignition count of each cylinder of an engine (i.e., engine-specific basis), in alternate embodiments where the engine includes distinct groups of cylinders, the routine may include comparing pre-ignition counts of each cylinder in a given group of cylinders (i.e., group-specific basis), and based on the comparison, adjusting an amount of fuel delivered to each cylinder in a given group of cylinders to bring the pre-ignition counts of each cylinder in that group closer to each other, while maintaining an exhaust air-to-fuel ratio of the given group of cylinders at or near stoichiometry. That is, the pre-ignition of each group of cylinders may be balanced independent of the other groups.

In another example, the engine may include a first group of cylinders and a second group of cylinders, and the engine controller may be configured to perform the cylinder pre-ignition balancing fuel adjustment for one group of cylinders but not the other. For example, the first group of cylinders may have a higher average pre-ignition count than the second group of cylinders. Alternatively, the first group of cylinders may have a cylinder having the highest pre-ignition count of all the cylinders of the engine. During such conditions, the engine controller may be configured to adjust the fueling of all cylinders of the first group only (and not of the second group of cylinders), to balance the incidence of pre-ignition in the first group only.

In still further examples, such as in engine systems configured to operate with one or more types of fuel, the fueling of each cylinder may be further adjusted based on a fuel type of the fuel injected into the cylinder. For example, where the injected fuel is an alcohol fuel (e.g., an ethanol-gasoline blend), the fueling may be adjusted based on an alcohol content (or octane content) of the injected fuel. This may include adjusting the amount of fuel delivered to each cylinder and/or adjusting the common pre-ignition count desired for the cylinders, based on the alcohol content (or octane content) of the injected fuel. In one example, the adjustment may include fueling each cylinder to bring the pre-ignition count of each cylinder to a lower common pre-ignition count as the alcohol content of the injected fuel increases.

Even after cylinder pre-ignition balancing fuel adjustments are performed, cylinder pre-ignition events may occur. In response to a further occurrence of pre-ignition in a given cylinder, the engine controller may be configured to enrich the affected cylinder (or group of cylinders) for a duration (e.g., a number of combustion events). Additionally, the controller may be configured to limit an engine load of the cylinder (or group of cylinders) for the duration, and update the pre-ignition count look-up table by increasing the pre-ignition count of the affected cylinder. The updated pre-ignition count may then be used to adjust cylinder pre-ignition balancing operations during subsequent engine cycles.

In this way, by fueling each cylinder of an engine based on a pre-ignition count of each cylinder of the engine, all the cylinders can be brought to a common pre-ignition count while maintaining the exhaust air-to-fuel ratio substantially at stoichiometry.

Figure 5:
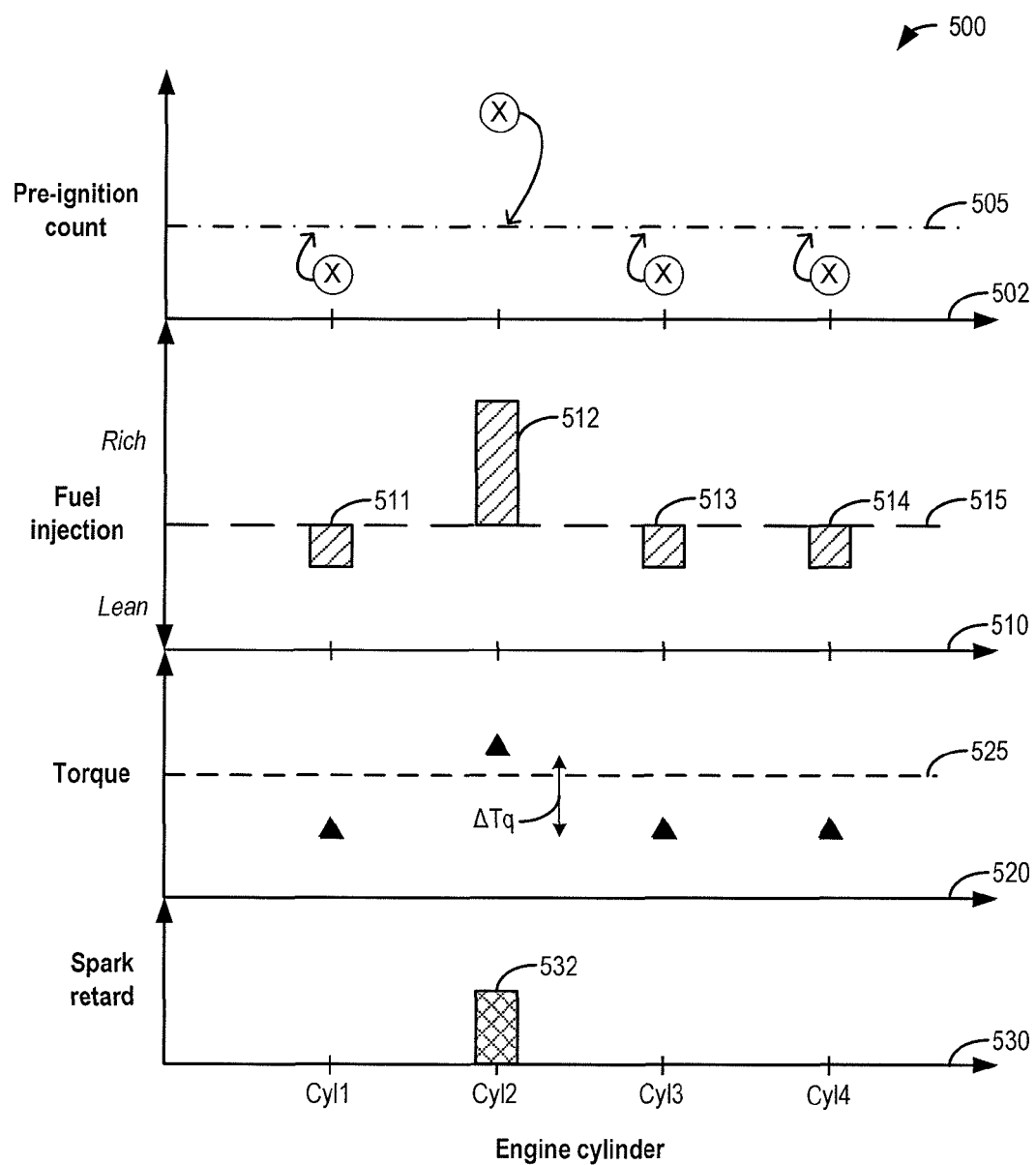
FIG. 5 shows an example fuel injection operation, according to the present disclosure.

Example cylinder fuel adjustments that may be used to bring cylinder pre-ignition counts closer to each other are now described with reference to FIG. 5 which includes example map 500 that graphically illustrates cylinder pre-ignition balancing adjustments as per routine 300 of FIG. 3.

Turning to map 500, individual cylinders of an engine system are plotted along the x-axis (herein four, cylinders 1-4, listed as Cyl1-Cyl4). In one example, the engine system may be a boosted engine including a turbocharger configured to provide a boosted intake aircharge to the engine. While the depicted map illustrates cylinders 1-4, it will be appreciated that the cylinder numbers are merely used to reflect a first, second, third and fourth cylinder of the engine and do not necessarily represent either the actual cylinder numbers, or their firing order. The pre-ignition counts for the respective cylinders is illustrated at graph 502, individual cylinder fuel injection adjustments are illustrated at graph 510, individual cylinder torque changes responsive to the cylinder fueling adjustments are plotted on graph 520, and spark timing adjustments used to compensate for the torque changes are plotted on graph 530.

Turning to graph 502, individual cylinder pre-ignition counts (each portrayed as an X), are depicted before cylinder fuel balancing adjustments. As shown, cylinder 2 has a relatively higher pre-ignition count, while cylinders 1, 3, and 4 have relatively lower, and substantially similar, pre-ignition counts. Based on the pre-ignition counts of each cylinder, a controller may select a common pre-ignition count 505. In the depicted example, the common pre-ignition count is a weighted average of the pre-ignition counts of the four cylinders. In alternate embodiments, the common pre-ignition count may be further adjusted based on an alcohol content of the available fuel (that will be injected). Further, the common pre-ignition count may be adjusted based on a knock rate of the cylinders to additionally balance the incidence of knock among the cylinders.

The controller may then determine a deviation of each cylinder's pre-ignition count from the common pre-ignition count (or weighted average). Herein, the deviations for each cylinder are portrayed by respective arrows. In the depicted example, the pre-ignition count deviation (from the common pre-ignition count 505) for each of the first, third and fourth cylinders is smaller than the deviation for the second cylinder.

Based on the deviations from the pre-selected common pre-ignition count 505, each cylinder is fueled to bring the pre-ignition count of each cylinder closer to the weighted average (that is, to common pre-ignition count 505). Specifically, the cylinder with a pre-ignition count higher than the weighted average (herein, cylinder 2) is enriched, while the cylinders with a pre-ignition count lower than the weighted average (herein, cylinders 1, 3, and 4) are enleaned. The degree of enrichment of cylinder 2, and the degree of enleanment of cylinders 1, 3, and 4, is based on the number of cylinders with a pre-ignition count higher than the weighted average (herein, one), and the number of cylinders with a pre-ignition count lower than the weighted average (herein, three). In the depicted example, since there are 3 cylinders with a pre-ignition count that is below the weighted average and only a single cylinder with a pre-ignition count that is above the weighted average, the degree of enrichment 512 (herein, amount of fuel injected) for cylinder 2 may be larger than the degree of enrichment for each of cylinders 1, 3, and 4 (herein, 511, 513, and 514, respectively). Further, since the pre-ignition counts of cylinders 1, 3, and 4 are substantially the same, the degree of enleanment of each of cylinders 1, 3, and 4 is $\frac{1}{3}^{rd}$ (in amplitude) of the degree of enrichment of cylinder 2. Further, a sum of the enleanment of the cylinders is adjusted to be equal to the sum of the enrichment of the other cylinders. In the depicted example, the sum of the lean fuel injection (511, 512, 514) for cylinders 1, 3, and 4 is equal to the rich fuel injection (512) for cylinder 2. Thus, the enrichment 512 of cylinder 2 is adjusted to offset the enleanment 511, 513, 514 of cylinders 1, 3, and 4 to maintain a net engine exhaust air-to-fuel ratio at stoichiometry (represented by dashed line 515). It will be appreciated that while the depicted example illustrates the concept of cylinder pre-ignition balancing with four cylinders, this is not meant to be limiting, and that in alternate examples, a larger or smaller number of cylinders may have their pre-ignition counts above or below the common pre-ignition count, and further, the pre-ignition count of each cylinder may substantially vary. Therein, the degree of enrichment and the degree of enleanment for each cylinder may be adjusted based on each cylinder's deviation from the common pre-ignition count such that a sum of the fuel injected into each cylinder having a pre-ignition count lower than the common pre-ignition count may equal a sum of the fuel injected into each cylinder having a pre-ignition count higher than the common pre-ignition count, thereby maintaining the net engine exhaust air-to-fuel ratio substantially at stoichiometry.

For example, a boosted engine may include a first cylinder with a first, higher pre-ignition count, a second cylinder with a second, lower pre-ignition count, and a third cylinder with a third pre-ignition count, lower that the first pre-ignition count. Herein, the engine controller may compare the first, second, and third pre-ignition counts, and select a common pre-ignition count based on the comparison. Then, the controller may inject fuel (for example, direct inject fuel via a direct fuel injector) into the first cylinder to enrich the first cylinder by a first amount, inject fuel into the second cylinder to enlean the second cylinder by a second amount, and inject fuel into the third cylinder to enlean the third cylinder by a third amount. Herein, the first, second, and third amounts may be based on a deviation of the first, second, and third pre-ignition counts from the common pre-ignition count, and may be adjusted to maintain the exhaust air-to-fuel ratio of the engine at or near stoichiometry. Specifically, based on the (greater) number of cylinders having a pre-ignition count below the common pre-ignition count and based on the (smaller) number of cylinders having a pre-ignition count above the common pre-ignition count, each of the second and third amounts of fuel injected into the second and third cylinders, respectively, may be adjusted to be smaller than the first amount injected into the first cylinder. Additionally, the sum of the first amount may equal the sum of the second and third amount.

Returning to FIG. 5, based on the individual cylinder fuel adjustments, individual torque changes, represented by triangles on graph 520, may occur. That is, torque for individual cylinders following fuel balancing adjustments may change from the common (desired) cylinder torque 525 (dashed line) before the fuel adjustment. In one example, a map, such as map 400 of FIG. 4, may be used to determine individual cylinder torque transients. The individual cylinder torque disturbances may lead to a torque difference (ΔTq) between the cylinders that were enleaned and the cylinders that were enriched. As such, if the torque difference is higher than a predetermined threshold, the torque transient may be felt by the vehicle operator and the quality of his driving experience may be reduced. Thus, in the depicted example, in response to the torque difference ΔTq between the torque of cylinder 2 and the average torque of cylinders 1, 3, and 4 being larger than a threshold, an amount of spark retard 532 for cylinder 2 may be increased (that is, ignition timing may be retarded further away from MBT). This may reduce the torque in cylinder 2, bringing it closer to the desired cylinder torque 525, and reducing the torque difference between the cylinders. As such, this may temporarily reduce the engine torque, however, the torque transient felt by the vehicle operator may be reduced, thereby improving his drive experience.

In this way, the present disclosure permits cylinder-to-cylinder imbalances in pre-ignition and/or knock incidence to be addressed. Specifically, by fueling each cylinder of an engine based on a comparison of the pre-ignition counts and knock rates of each cylinder of the engine, all the cylinders can be brought to a common pre-ignition and knock incidence. By selecting a common pre-ignition count that enables the fuel enrichment of some engine cylinders to be offset by the fuel enleanment of other engine cylinders, cylinder pre-ignition balancing is achieved while maintaining a stoichiometric exhaust air-to-fuel ratio. Further, a high occurrence of pre-ignition or knock in any particular cylinder can be reduced, thereby reducing engine degradation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising,
fueling each of a plurality of engine cylinders based on a pre-ignition count of each cylinder to bring each cylinder to a common pre-ignition count while maintaining an engine exhaust air-to-fuel ratio at or near stoichiometry, each cylinder's pre-ignition count based on a number of pre-ignition events in that cylinder's pre-ignition history.

2. The method of claim 1, wherein the common pre-ignition count is a weighted average of the pre-ignition count of all the cylinders, and where each cylinder's pre-ignition count includes the number of pre-ignition events in that cylinder's pre-ignition history for a present trip.

3. The method of claim 1, wherein the fueling includes enriching a cylinder with a relatively higher pre-ignition count and enleaning a cylinder with a relatively lower pre-ignition count.

4. The method of claim 3, wherein a degree of enrichment and a degree of enleanment are based on a number of cylinders with a pre-ignition count above the common pre-ignition count and a number of cylinders with a pre-ignition count below the common pre-ignition count, and further based on a deviation of each cylinder's pre-ignition count from the common pre-ignition count.

5. The method of claim 4, wherein the degree of enrichment and the degree of enleanment of the cylinders are adjusted to maintain the engine exhaust air-to-fuel ratio at or near stoichiometry.

6. The method of claim 5, further comprising, adjusting an ignition spark timing of at least one cylinder based on a cylinder torque difference between the cylinders.

7. The method of claim 1, wherein the fueling is further based on a knock rate of each cylinder to bring the knock rate of each cylinder to a common average knock rate.

8. The method of claim 1, further comprising, in response to an occurrence of pre-ignition in a cylinder, enriching the affected cylinder for a number of combustion events and increasing the pre-ignition count of the affected cylinder.

9. The method of claim 1, wherein the engine is a boosted engine, and fueling each cylinder includes direct injecting fuel into each cylinder.

10. The method of claim 1, wherein the fueling is further adjusted based on a fuel type of fuel injected into the cylinder, the adjustment including fueling each cylinder to bring the pre-ignition count of each cylinder to a lower common pre-ignition count as an alcohol content of the injected fuel increases.

11. The method of claim 1, further including enriching a first cylinder to decrease its pre-ignition count and enleaning a second cylinder to increase its pre-ignition count.

12. A method for an engine cylinder group, comprising,
comparing respective pre-ignition counts of each cylinder in the group with one another, each cylinder's count based on that cylinder's pre-ignition history; and
based on the comparison, adjusting an amount of fuel delivered to each cylinder in the group to bring the counts of the cylinders closer to one another, while maintaining an exhaust air-to-fuel ratio of the group at or near stoichiometry.

13. The method of claim 12, wherein bringing the pre-ignition counts of the cylinders closer to one another includes bringing the pre-ignition count of each cylinder to a weighted average of the pre-ignition counts of the cylinders in the group.

14. The method of claim 13, wherein the adjustment includes enriching each cylinder with a pre-ignition count higher than the weighted average, and enleaning each cylinder with a pre-ignition count lower than the weighted average.

15. The method of claim 14, wherein a degree of enrichment and a degree of enleanment of each cylinder are based on a number of cylinders with a pre-ignition count higher than the weighted average, a number of cylinders with a pre-ignition count lower than the weighted average, and a deviation of each cylinder's pre-ignition count from the weighted average.

16. The method of claim 15, wherein the degree of enrichment and the degree of enleanment are further adjusted to maintain the exhaust air-to-fuel ratio of the group of cylinders at or near stoichiometry.

17. The method of claim 12, further comprising, in response to an occurrence of pre-ignition in a cylinder, enriching the cylinder group for a duration, limiting an engine load of the group of cylinders for the duration, and increasing the pre-ignition count of the cylinder.

18. An engine system, comprising,
an engine including a first cylinder with a first, higher pre-ignition count over a trip and a second cylinder with a second, lower pre-ignition count over the trip;
a turbocharger configured to provide a boosted intake air-charge to the engine;
a direct fuel injector configured to direct inject an amount of fuel into the first and/or the second cylinder; and
a controller with computer-readable instructions for,
comparing the first and second pre-ignition counts;
selecting a common pre-ignition count based on the comparison;
injecting fuel into the first cylinder to enrich the first cylinder by a first amount to decrease the first pre-ignition count toward the common pre-ignition count; and
injecting fuel into the second cylinder to enlean the second cylinder by a second amount to increase the second pre-ignition count toward the common pre-ignition count, wherein the first and second amounts are based on a deviation of the first and second pre-ignition counts from the common pre-ignition count, and wherein the first and second amounts are adjusted to maintain an exhaust air-to-fuel ratio of the engine at or near stoichiometry.

19. The system of claim 18, further comprising a third cylinder with a third pre-ignition count, lower that the first pre-ignition count, wherein the controller further includes instructions for injecting fuel into the third cylinder to enlean the third cylinder by a third amount, wherein the second and third amounts are smaller than the first amount, and wherein the first, second, and third amounts are adjusted to maintain the exhaust air-to-fuel ratio of the engine at or near stoichiometry, wherein the common pre-ignition count is further adjusted based on an alcohol content of the injected fuel.

20. The system of claim 19, wherein the common pre-ignition count is further adjusted based on a knock rate of the first and second cylinders.

* * * * *